United States Patent
Hutter, III

(10) Patent No.: US 6,727,466 B2
(45) Date of Patent: Apr. 27, 2004

(54) ADHESIVE ATTACHMENT ASSEMBLY WITH HEAT SOURCE

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 0 days.

(21) Appl. No.: 10/317,863

(22) Filed: Dec. 11, 2002

(65) Prior Publication Data

US 2003/0116282 A1 Jun. 26, 2003

Related U.S. Application Data

(60) Provisional application No. 60/341,623, filed on Dec. 18, 2001.

(51) Int. Cl.[7] .............................. H05B 3/06; H05B 3/30; B32B 7/12; B32B 31/26; B32B 31/20
(52) U.S. Cl. ...................... 219/201; 219/213; 219/521; 156/71; 156/91
(58) Field of Search .................. 219/201, 213, 219/200, 221, 521; 156/160, 272.2, 273.7, 275.5, 275.7, 321, 379.7, 379.8, 71, 91

(56) References Cited

U.S. PATENT DOCUMENTS

| | | | | |
|---|---|---|---|---|
| 3,719,792 A | * | 3/1973 | Cuccaro | 219/320 |
| 4,302,492 A | * | 11/1981 | Hutter, III | 156/71 |
| 4,338,151 A | * | 7/1982 | Hutter, III | 156/71 |
| 4,778,702 A | * | 10/1988 | Hutter, III | 156/71 |
| 4,822,656 A | * | 4/1989 | Hutter, III | 156/71 |
| 5,589,026 A | * | 12/1996 | Perecman | 156/321 |

* cited by examiner

Primary Examiner—Joseph Pelham
(74) Attorney, Agent, or Firm—Kelly Bauersfeld; Lowry & Kelley, LLP

(57) ABSTRACT

An adhesive attachment assembly is provided for mounting an attachment member such as a threaded stud or the like onto a substrate, wherein the attachment assembly includes a heat source for rapidly curing a selected adhesive bonding agent. The adhesive attachment assembly includes a first attachment component defining a base surface for receiving the curable bonding agent thereon, and a second attachment component adapted for temporary connection to the substrate. Upon pressed mounting of the first attachment component with bonding agent thereon onto the substrate, the second attachment component is movable into temporary engagement with the substrate, and a spring member reacts between the first and second attachment components to apply a positive force urging the first attachment component toward the substrate for the duration of the bonding agent cure time. A heat source is carried by the first attachment component for activating and/or rapidly curing the bonding agent.

32 Claims, 6 Drawing Sheets

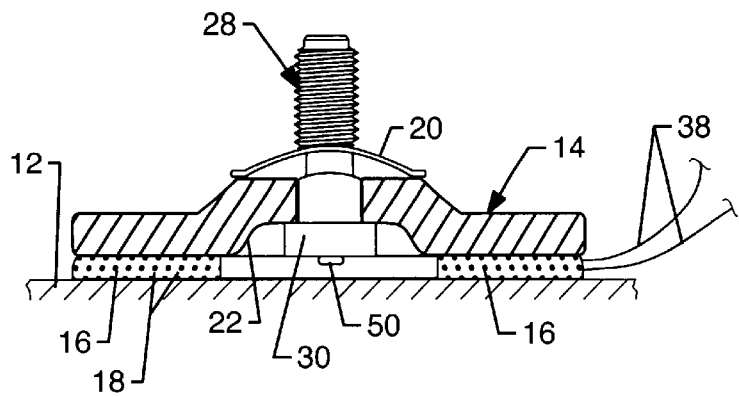
FIG. 6
FIG. 7
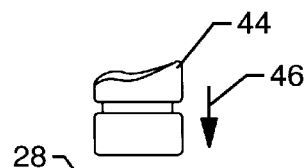
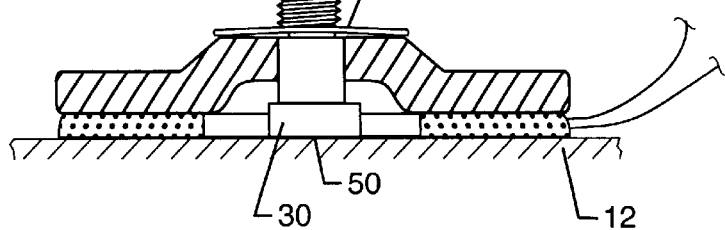
FIG. 8

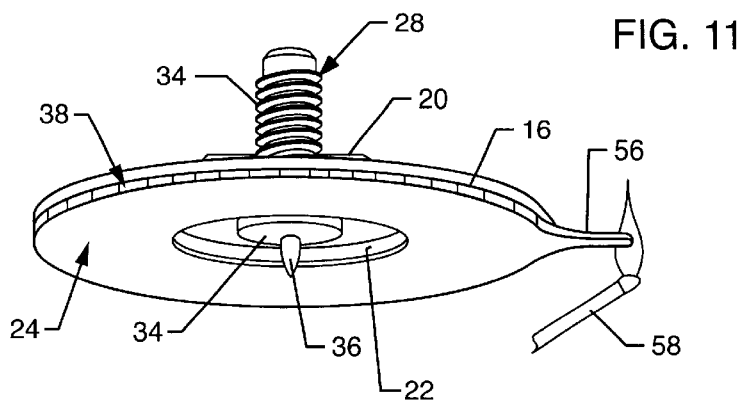
FIG. 11
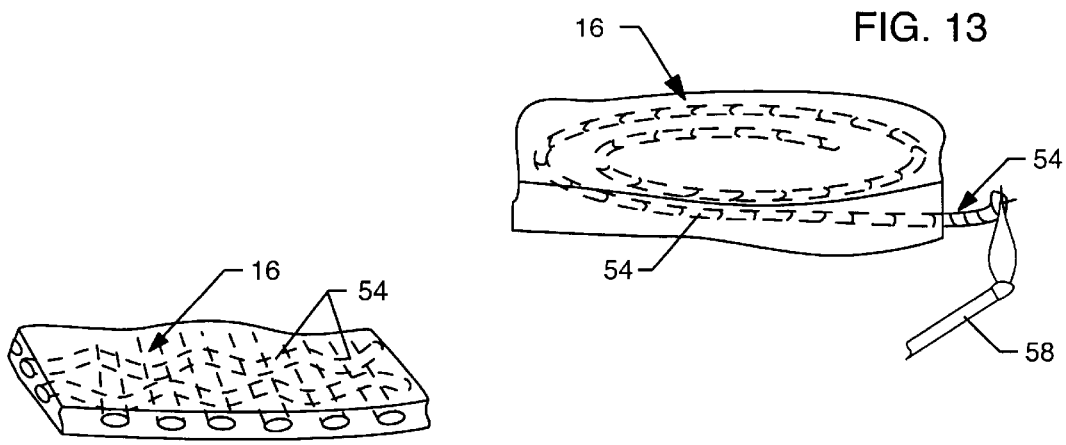
FIG. 12
FIG. 13
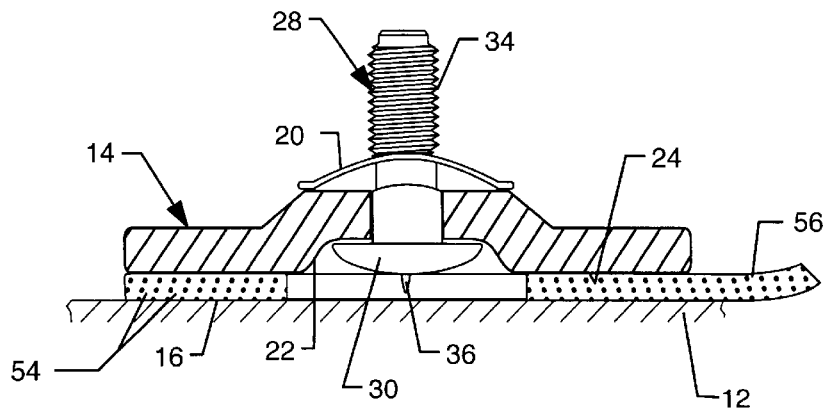
FIG. 14

ADHESIVE ATTACHMENT ASSEMBLY WITH HEAT SOURCE

This application claims the benefit of U.S. Provisional Application No. 60/341,623, filed Dec. 18, 2001, now abandoned.

This invention relates generally to adhesive attachment assemblies or fixtures and related methods for securely mounting an adhesive attachment such as a threaded stud or the like onto a supporting surface or substrate. More specifically, this invention relates to improvements in such adhesive attachment assemblies or fixtures, of the general type shown and described in U.S. Pat. Nos. 4,302,492; 4,338,151; 4,390,546; 4,668,546; 4,778,702; 4,822,656; and in copending U.S. Ser. No. 10/219,707, filed Aug. 14, 2002, and particularly with respect to providing a heat source for activating and/or rapidly curing a selected adhesive bonding agent.

BACKGROUND OF THE INVENTION

In many instances, it is necessary or desirable to attach an element such as a patch, threaded screw, or other structure onto a supporting substrate. For example, it may necessary to apply a thin patch to the skin of an aircraft or to the hull of a boat to repair a hole therein. Alternately, it may be desirable to mount a threaded stud or other device onto a substrate, for example, the windshield of an automobile, without requiring a hole to be made in the substrate. In many such cases, it is necessary for the attachment member to be located on the substrate with relatively high precision and further that a positive force be applied urging the attachment member against the substrate for at least some minimum time period to allow, for example, curing of an adhesive bonding agent such as a curable epoxy or the like to achieve a substantially optimized and secure bond with the substrate.

In the past, many different clamp and fixture devices have been proposed for use in temporarily holding an attachment member on the surface of a substrate during the cure time of a bonding agent. The majority of such clamp and fixture devices have required some form of mechanical connection to the substrate by means of screws or other mechanical fasteners, clamping jaws, etc. However, these devices are not suited for use with extended surface areas or for use with fragile or thin-walled substrates within which surface interruptions to accommodate mechanical fasteners are not possible or desirable. Other fixturing devices have been proposed which rely upon suction cups for holding an attachment member in position on a substrate, but suction cup devices are limited to use with relatively clean and smooth-surfaced substrates and further function to retain the attachment member in place without exerting significant positive forces urging the attachment member against the substrate. As a result, with suction cup devices, the bonding agent on the substrate can be unevenly distributed and/or cure with less than optimum bond strength.

Improved adhesive attachment devices are described and claimed in U.S. Pat. Nos. 4,302,492; 4,338,151; 4,390,546; 4,668,546; 4,778,702; and 4,822,656. More particularly, these devices disclose attachment devices having a support fixture for temporary securement to the substrate by means of a pressure sensitive adhesive or the like, in combination with force bias or spring means for applying a force urging the attachment member into positive bearing engagement with the substrate for the cure time duration of a selected adhesive bonding agent. The support fixture or a portion thereof is movable between a first position with the adhesive member substantially out of bearing engagement with the substrate to a second position with the attachment member pressed firmly against the substrate. An over-center mechanism constitutes the movable element in most of the described embodiments. Following curing of the adhesive bonding agent, the support fixture is removed from the substrate to leave the attachment member such as a threaded bolt or the like securely bonded to the substrate. In this regard, the pressure sensitive adhesive has a sufficient adhesion strength for retaining the attachment member in position during curing of the bonding agent, but insufficient adhesion strength to preclude subsequent tear-off removal of the support fixture from the substrate.

Copending U.S. Ser. No. 10/219,707, filed Aug. 14, 2002 (based on U.S. Provisional Appln. No. 60/312,691, filed Aug. 14, 2001), discloses additional adhesive attachment configurations, wherein removal of a support fixture component following curing of the adhesive bonding agent is not required. Some of the embodiments shown and described in this copending provisional application are particularly suited for adhesively mounting an attachment member to a concrete substrate which, in some instances, can present a substrate surface that is relatively rough and porous, and may be disrupted by the presence of dust and dirt particles. In a substrate surface having these characteristics, specialized adhesive bonding agents of a heat-curable type may be desirable in order to achieve a high strength bond connection. Similarly, installation of these adhesive attachment devices onto a substrate during cold weather conditions can result in a prolonged bonding agent cure time and/or a less than optimum bond strength connection, whereby relatively rapid heat curing of the bonding agent is such conditions is also desirable.

The present invention provides an improved adhesive attachment assembly which incorporates a heat source for applying heat energy in a controlled manner to an adhesive bonding agent. The present invention may thus be used with heat activated and/or heat curable bonding agents to achieve a relatively rapid and high strength bond connection with a concrete substrate or the like, and also to achieve a relatively rapid and high strength curing of a bonding agent despite cold weather conditions.

SUMMARY OF THE INVENTION

In accordance with the invention, an improved adhesive attachment assembly is provided for securely mounting an attachment member such as a threaded stud or the like relative to the surface of a substrate. The adhesive attachment assembly comprises a first attachment component defining a base surface for receiving a selected bonding agent thereon, and movably carrying a second attachment component including means for temporary attachment or securement to the substrate. Upon pressed mounting of the first attachment component with the bonding agent thereon onto the surface of the substrate, the second attachment component is movable into temporary connection with the substrate. A spring member reacting between the first and second attachment components applies a positive force urging the first attachment component against the substrate for the duration of the bonding agent cure time. A heat source is carried by the attachment assembly for applying heat energy to the bonding agent, for purposes of activating and/or rapidly curing the bonding agent to provide a substantially optimized bond strength connection between the first attachment component and the substrate.

In one preferred form, the first attachment component comprises a base fixture in the shape of a centrally dished disk to define a shallow cavity at a blind side thereof, and wherein this shallow cavity is circumscribed by the base surface of generally annular shape. The second attachment component comprises a threaded bolt or the like having an enlarged head seated within said disk cavity and a threaded shank protruding through a central disk port to a front side of the base fixture. A bolt shoulder of noncircular or square cross section or the like may be positioned within the disk port which may have a mating noncircular or square cross sectional shape or the like to prevent relative rotation between the attachment component and the base fixture. The temporary attachment means may comprise a pointed tip nail or the like such as a concrete nail for temporary connection with a concrete substrate or the like, and the spring member may comprise a leaf spring or the like reacting between the threaded bolt and the base fixture.

Alternately, the temporary attachment means may comprise a pressure sensitive adhesive member such as a pressure sensitive elastomer of the type marketed by 3M Company of Minneapolis, Minn., under the product designation VHB Type 4910 having elastomeric bulk properties allowing 100% elongation without tearing and having a coating of high strength acrylic pressure sensitive adhesive on opposite sides of the approximately 0.040 inch thick tape. This adhesive member additionally provides the spring member reacting between the threaded bolt and the base fixture. In a further alternative form, the temporary attachment means may comprise a rupturable bead or ampoule containing a selected adhesive material such as a cyanoacrylate adhesive.

The selected adhesive bonding agent is applied to the annular base surface at the blind or underside of the base fixture, wherein this bonding agent may be applied to the base surface in flowable form, or alternately in the form of a heat activated disk adhered to the base surface. The base fixture is then press-mounted onto the substrate at a selected location, followed by displacement of the threaded bolt into temporary connection with the substrate. In this configuration, the spring member applies a positive force urging the base fixture against the substrate.

The heat source carried by the attachment assembly comprises, in one preferred form, an electrical resistance heating element positioned within the bonding agent, or alternately mounted on the base fixture at a front side thereof for delivery of heat energy through a heat conductive base fixture to the bonding agent. When a heat activated bonding agent is used, this heating element may be embedded directly within the adhesive disk. The heat source is coupled to a suitable power supply, such as a battery power supply, for delivering heat energy to the bonding agent. Control means are desirably provided for cycling the delivery of heat energy in a pulsating manner.

In an alternative preferred form, the heat source may comprise a pyrogenic source in the form of an oxidizer and polymer embedded within a support disk. In one configuration, the support disk may comprise the selected bonding agent in heat activated form for mounting onto the base surface. In another configuration, the support disk may be adapted for mounting onto a front side of the base fixture to deliver heat through a heat conductive base fixture to the bonding agent. In either case, the embedded oxidizer can be ignited to produce an exothermic reaction for delivering heat energy to the bonding agent.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a fragmented sectional view similar to FIG. 3, but illustrating initial placement of one alternative preferred form of the invention onto a substrate;

FIG. 7 is a fragmented sectional view similar to FIG. 6, and showing displacement of an attachment component of the embodiment of FIG. 6 into temporary adhesive connection with the substrate for applying a positive force urging a base fixture against the substrate for the duration of a bonding agent cure time;

FIG. 8 is a fragmented sectional view similar to FIG. 7, and showing the adhesive attachment assembly of FIGS. 6–7 in a position bonded to the substrate;

FIG. 11 is a bottom perspective view of another alternative preferred form of the invention;

FIG. 12 is an enlarged fragmented perspective view illustrating construction details of a pyrogenic adhesive layer for use in the embodiment of FIG. 11;

FIG. 13 is an enlarged fragmented perspective view depicting alternative construction details of a pyrogenic adhesive layer for use in the embodiment of FIG. 11;

FIG. 14 is a fragmented sectional view showing initial placement of the embodiment of FIG. 11 onto a substrate;

DETAILED DESCRIPTION OF THE PREFERRED EMBODIMENTS

Figure 1:
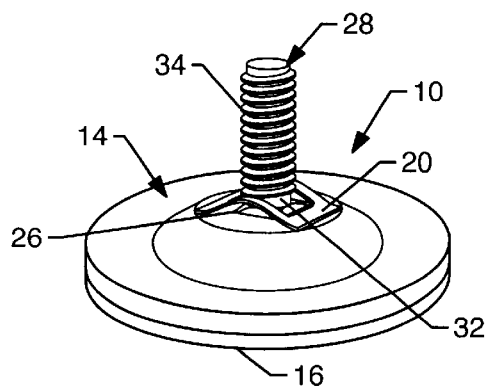
FIG. 1 is a fragmented top perspective view illustrating an adhesive attachment assembly in one preferred form, incorporating a heat source for accelerated curing of a selected adhesive bonding agent.
Figure 2:
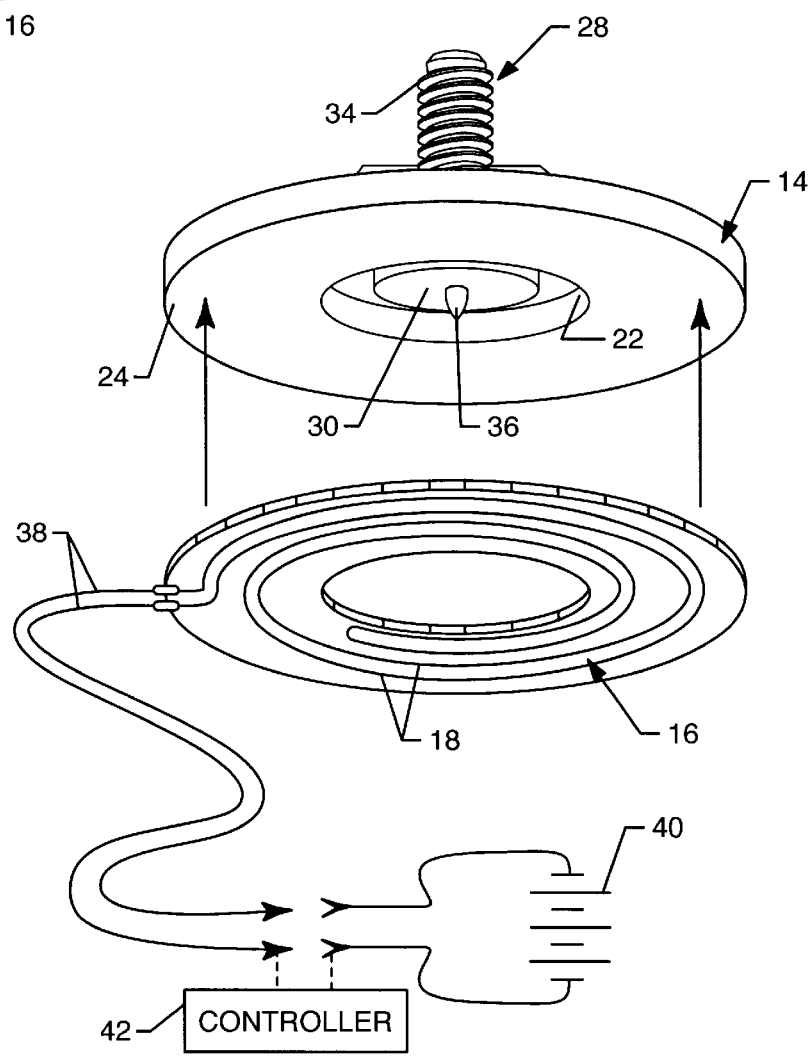
FIG. 2 is an enlarged and exploded bottom perspective view of the adhesive attachment assembly of FIG. 1.
Figure 3:
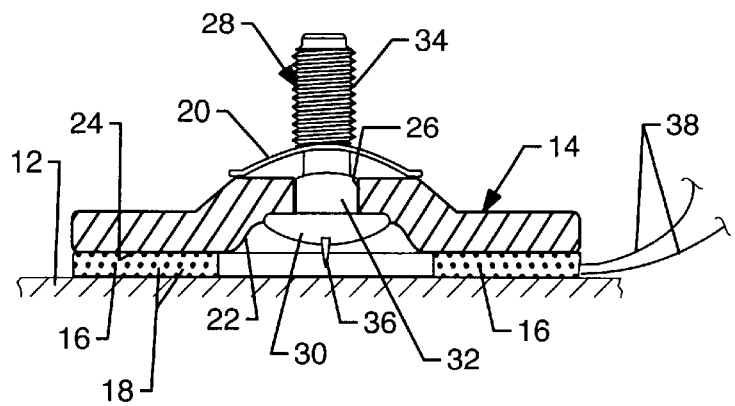
FIG. 3 is a fragmented sectional view of the adhesive attachment assembly, depicting initial placement thereof onto the surface of a substrate.
Figure 4:
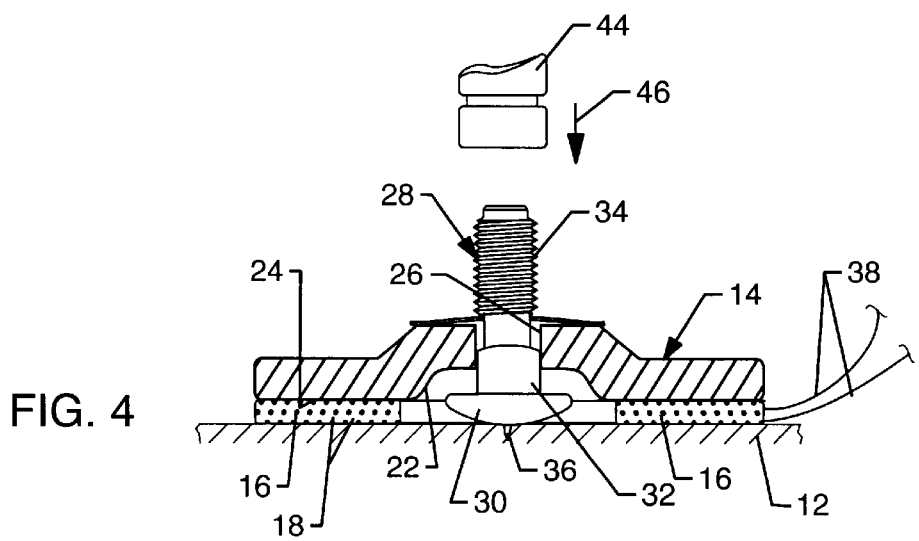
FIG. 4 is a fragmented sectional view similar to FIG. 3, and showing displacement of an attachment component into temporary connection with the substrate for applying a positive force urging a base fixture against the substrate for the duration of a bonding agent cure time.
Figure 5:
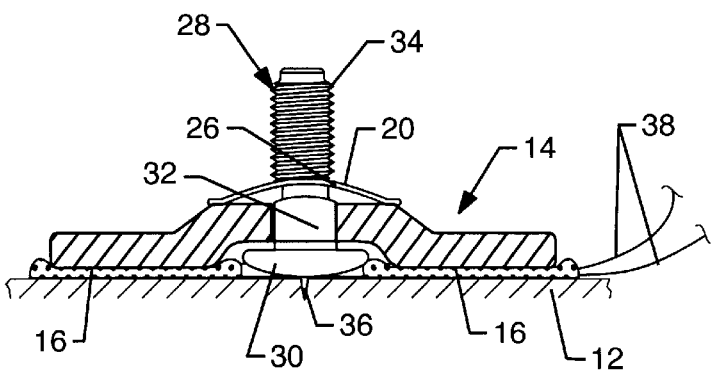
FIG. 5 is a fragmented sectional view similar to FIG. 4, and showing the adhesive attachment assembly in a position bonded to the substrate.

As shown in the exemplary drawings, an improved adhesive attachment assembly referred to generally in FIGS. 1–5 by the reference numeral 10 is provided for securely mounting an adhesive attachment member onto the surface of a substrate 12 (FIGS. 3–5). The attachment assembly 10 includes base fixture 14 adapted for adhesive mounting onto the substrate 12 by means of a selected adhesive bonding agent 16, wherein the bonding agent 16 is activated and/or rapidly cured by a heat source 18 depicted in the embodiment of FIGS. 1–5 in the form of an electrical resistance heating element. Such heat-curing of the bonding agent 16, in combination with a spring member 20 for positively forcing the base fixture 14 against the substrate 12 for the bonding agent cure time, provides a substantially optimized bond strength connection between the base fixture 14 and the substrate 12.

The adhesive attachment assembly 10 is shown in FIGS. 1–5 in one preferred form, suitable for adhesive mounting onto a substrate 12 such as concrete which can be relatively rough, porous, and/or defines a surface which may include dust and dirt particles. The illustrative attachment assembly comprises a first attachment component in the form of the base fixture 14 which can be formed from a metal, plastic, or composite material selected for optimum bond strength attachment to the substrate material. The base fixture 14 is shown to have a centrally dished construction defining a shallow cavity 22 (FIGS. 2–5) at a rear or blind side thereof, wherein this blind side cavity 22 is circumscribed or surrounded by a relatively flat annular base surface 24. A central port 26 is formed in the base fixture 14, generally coaxially with the cavity 22, and preferably has a noncircular port shape such as a square shape shown best in FIG. 1.

The attachment assembly 10 further comprises a second attachment component 28 shown in FIGS. 1–5 in the form of a threaded bolt or stud, although persons skilled in the art will recognize and appreciate that alternative attachment components such as a patch, cable tie or the like may be used. As shown, the threaded bolt 28 has an enlarged bolt head 30 having a size and shape for nested reception into the blind side cavity 22 of the base fixture 14, in a position seated against the centrally dished portion defining the cavity 22. A bolt shoulder 32 projects from the bolt head 30 into and through the central port 26 formed in the base fixture 14, wherein this bolt shoulder 32 desirably has a noncircular shape such as the illustrative square shape (FIG. 1) to fit matingly through said central port 26 whereby relative rotation between the bolt 28 and the base fixture 14 is substantially prevented. This bolt shoulder 32 is joined in turn with a threaded shank 34 which projects forwardly from and is thus exposed at a front side of the base fixture 14.

The bolt 28 carries temporary attachment means for temporary connection with the substrate 12, upon adhesive mounting of the attachment assembly 10 to the substrate 12. More particularly, in the embodiment of FIGS. 1–5, this temporary attachment means comprises a pointed tip nail 36 such as a short concrete nail projecting downwardly from the underside or blind side of the bolt head 30. In addition, the spring member 20 is provided in the form of a leaf spring carried by the threaded shank 34 of the bolt 28 for reacting between the bolt and a front side of the base fixture 14. In a normal unstressed configuration as shown in FIG. 3, the leaf spring 20 shifts the bolt head 30 upwardly against the underside of the base fixture 14, within the cavity 22, so that the pointed tip of the nail 36 is at least slightly inset into the cavity 22 with respect to a plane of the base surface 24.

In use, the selected adhesive bonding agent 16 is applied to the base surface 24 of the base fixture 14, whereupon the base fixture 14 is then press-mounted onto the substrate 12 at a selected position to press the adhesive-coated base surface 24 firmly against the substrate. In one preferred form as shown, the bonding agent 16 comprises a heat activated material such as a heat activated epoxy formed into a thin disk or ring (shown best in FIG. 2) having a size and shape for suitable adhesive mounting onto the base surface 24 of the base fixture. In accordance with a primary aspect of the present invention, this adhesive ring 16 has the heat source 18 embedded directly therein in the form of a thin wire electrical resistance heating element. A pair of conductive leads 38 are exposed at one side edge of the adhesive ring 16 for appropriate connection to a suitable power source 40, such as a battery power source or the like. A controller 42 may also be provided for regulating the operation of the heating element, as will be described further herein, to achieve substantially optimized cure time and cure strength for the adhesive material.

FIG. 3 shows pressed mounting of the base fixture 14 with the adhesive ring 16 carried on the base surface 24 thereon against the substrate 12. In this initial mounted position, the pointed tip of the temporary fastener nail 36 is retained by the leaf spring 20 in a position retracted at least slightly from the surface of the substrate. A suitable impact tool 44 (FIG. 4) can then be used to apply a sharp impact force to the bolt 28 in the direction of arrow 46, driving the fastener nail 36 in a direction to embed the nail into the substrate 12. Such displacement of the bolt 28 relative to the base fixture 14 deflects the spring 20, resulting in a spring force urging the base fixture 14 positively toward and against the substrate 12.

The heat source 18 is then energized to input heat energy to the adhesive bonding agent 16, for purposes of activating and/or rapidly curing the bonding agent. In a preferred process, the controller 42 regulates the delivery of heat energy to the bonding agent, preferably by operating the heat source in a sequence of relatively rapid short pulses, for effectively activating and curing the bonding agent. The positive force applied by the spring 20 is maintained throughout this curing cycle, so that the bonding agent is extruded between the base surface 24 and the substrate 12 to form a thin bond layer of precision uniform thickness (FIG. 5) to achieve a substantially optimized bond strength.

In accordance with the invention, the heat source 18 accommodates a heat activated bonding agent, although the bonding agent may alternatively be applied to the base fixture 14 in liquid form from a suitable applicator (not shown). When the bonding agent 16 is provided as the pre-formed adhesive ring as shown in FIGS. 1–5, the heat source 18 functions to melt and activate the bonding agent, and then continues to apply heat in a controlled manner to achieve a rapid and high strength cure. When the bonding agent is applied in liquid form to the base fixture, the heat source 18 applies heat in a controlled manner to achieve the desired rapid and high strength cure. In this regard, the inclusion of the heat source 18 is especially desirable for use in cold weather climate conditions for achieving an optimized high strength connection of the base fixture 14 to the substrate 12.

After the bonding agent 16 has cured, the threaded bolt 28 may be used in a normal manner, as by affixation of a threaded nut (not shown) to the threaded shank 34 for connecting a desired structure such as a wood frame element (also not shown) thereto. In this regard, in the illustrative embodiment of the invention, the base fixture 14 is not removed from the substrate 12 following curing of the bonding agent 16, but instead remains securely fastened to the substrate for purposes of supporting and retaining the bolt 28 in place. Subsequent forces applied to the bolt 28 or alternative attachment component during normal use may be sufficient to separate the bolt head 30 from temporary attachment to the substrate, but such normal usage forces are insufficient to separate the base fixture 14 from the substrate 12. The heat source 18 is left in position, embedded within the cured bonding agent 16, with the conductors 38 being severed to accommodate separation from the power source 40.

FIGS. 6–8 depict one alternative preferred form of the invention, wherein an alternative temporary attachment means is provided for connecting the threaded bolt 28 or the like to the substrate 12 for the duration of the bonding agent cure time. For ease and clarity of description, components shown in FIGS. 6–8 which are identical to those previously shown and described with respect to FIGS. 1–5 are identified by the same reference numerals.

More particularly, FIG. 6 shows the alternative temporary attachment means in the form of a rupturable ampoule 50 containing a selected temporary adhesive material such as a cyanoacrylate adhesive. This ampoule 50 is carried by the head 30 of the threaded bolt 28 at a blind side thereof, within the blind side cavity 22 formed by the centrally dished portion of the base fixture 14. The leaf spring 20 normally supports the threaded bolt 28 in a position with the ampoule 50 retained in at least slightly spaced relation with the substrate 12, upon initial pressed placement of the base fixture 14 against the substrate. FIG. 7 shows use of the impact tool 44 to apply an impact force in the direction of arrow 46 to the threaded bolt 28, for purposes of driving the bolt head 30 against the substrate 12 with a force sufficient to rupture the ampoule 50. Such ampoule breakage releases the adhesive material therein for temporarily connecting the bolt head 30 to the substrate 12. In this position, the spring 20 is partially collapsed as previously described to apply the desired spring force urging the base fixture positively against the substrate 12 for the duration of the cure time of the bonding agent 16. As previously described, the heat source 14 embedded within the bonding agent 16 activates and/or rapidly cures the bonding agent to achieve the desired high strength connection of the base fixture 14 to the substrate 12 (FIG. 8).

Additional alternative adhesive attachment assembly configurations may be provided for short-term connection of the threaded bolt 28 or other attachment component to the substrate 12 while the bonding agent 16 cures. In this regard, persons skilled in the art will recognize and appreciate that the heat source 14 may be utilized in the attachment assemblies shown and described in U.S. Pat. Nos. 4,302,492; 4,338,151; 4,390,546; 4,668,546; 4,778,702; and 4,822,656, as well as the attachment assemblies and temporary adhesive materials shown and described in copending U.S. Ser. No. 10/219,707, filed Aug. 14, 2002, all of which are incorporated by reference herein.

Figure 9:
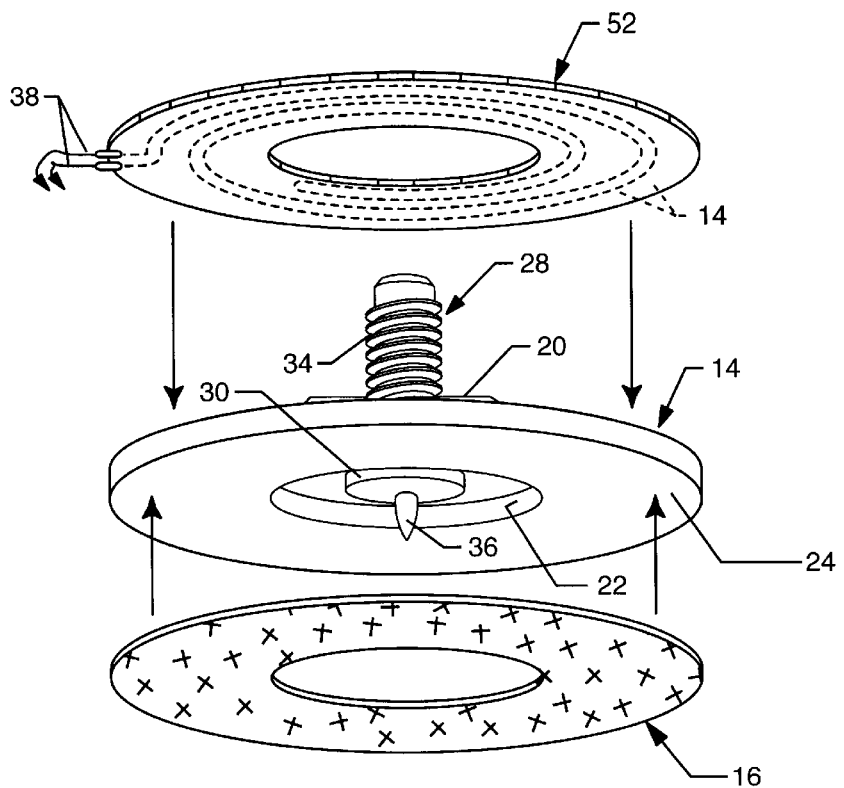
FIG. 9 is an exploded bottom perspective view depicting a further alternative preferred form of the invention.
Figure 10:
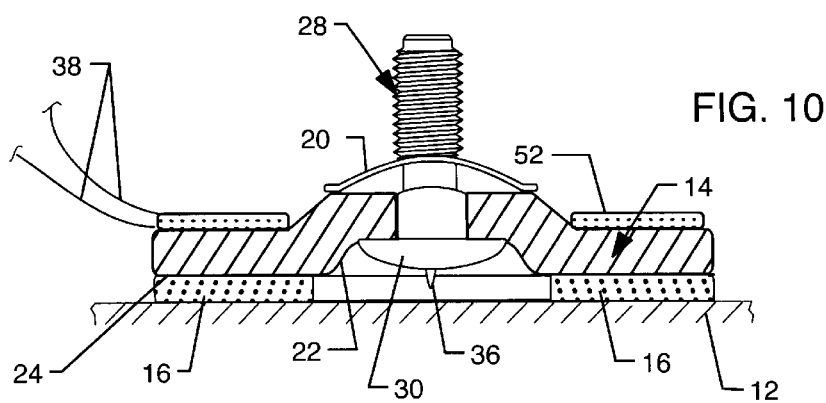
FIG. 10 is a fragmented sectional view showing initial placement of the embodiment of FIG. 9 onto a substrate.

FIGS. 9–10 illustrate another alternative preferred form of the invention, wherein components common to those shown and described previously herein with respect to FIGS. 1–5 are again identified by identical reference numerals. In this embodiment, the heat source 14 is not embedded directly within the adhesive bonding agent 16 carried on the base surface 24 of the base fixture 14, but instead the heat source 14 is mounted onto the base fixture 14 at a front side thereof and functions to apply heat energy through the base fixture 14 to the bonding agent 16. In this version, the base fixture 14 is formed from a heat conductive material, such as a selected metal.

More specifically, the overall construction and operation of the attachment assembly shown in FIGS. 9–10 is the same as previously described with respect to FIGS. 1–5, except that the heat source 14 in the form of the electrical resistance heating element is embedded within a thin heater ring 52 mounted as by a suitable adhesive onto the front side of the base fixture 14 in a position overlying the outer ring portion thereof defining the blind side base surface 24. An adhesive ring 16 of selected heat-activated bonding agent in meltable or liquid form is provided for mounting onto the blind side base surface 24. The attachment assembly is designed for initial pressed mounting onto the substrate 12 in the same manner as previously described, and includes a temporary attachment means such as the illustrative concrete nail 36 or the like for temporary connection of the bolt head 30 to the substrate. This partially collapses the spring 20 for urging the base fixture 14 positively against the substrate 12, all as previously described, for the duration of the bonding agent cure time. Importantly, during this cure time, the heat source 14 is appropriately energized for delivering heat energy through the base fixture 14 to the bonding agent 16 for activating and/or rapidly curing the bonding agent.

FIGS. 11–14 show a further alternative preferred embodiment of the invention, wherein the heat source is provided in an alternative form comprising a pyrotechnic or pyrogenic heat source in lieu of the electrical resistance heating element. Once again, for ease and clarity of description, components common to those previously shown and described are referred to by identical reference numerals.

FIG. 11 shows a modified adhesive attachment assembly which again has an overall construction and operation corresponding to the embodiment as previously described with respect to FIGS. 1–5, except that a modified heat source comprises a pyrogenic heat source in the form of the adhesive ring 16 including the selected bonding agent in combination with a homogeneously embedded oxidizer and associated polymer. FIG. 12 shows a fuse cord 54 embedded within the adhesive ring 16 in an interwoven mesh pattern, whereas FIG. 13 illustrates the fuse cord 54 in an alternative spiral ring pattern. In either case, following initial pressed mounting of the attachment assembly onto the substrate 12 in the same manner as previously, described (as viewed in FIG. 14), followed by temporary connection of the bolt 28 or other attachment component to the substrate. A laterally projecting tab 56 on the adhesive ring 16 is then fired by means of a match 58 or the like to ignite the fuse cord 54. As the fuse cord 54 burns, the embedded oxidizer and polymer are decomposed in an exothermic reaction to generate heat energy which activates and/or rapidly cures the bonding agent in the same manner as previously described.

Figure 15:
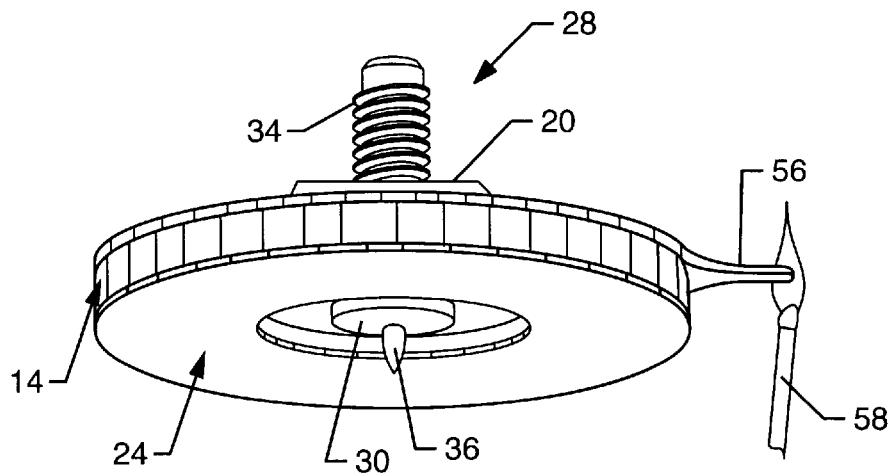
FIG. 15 is a bottom perspective view of still another alternative preferred form of the invention.
Figure 16:
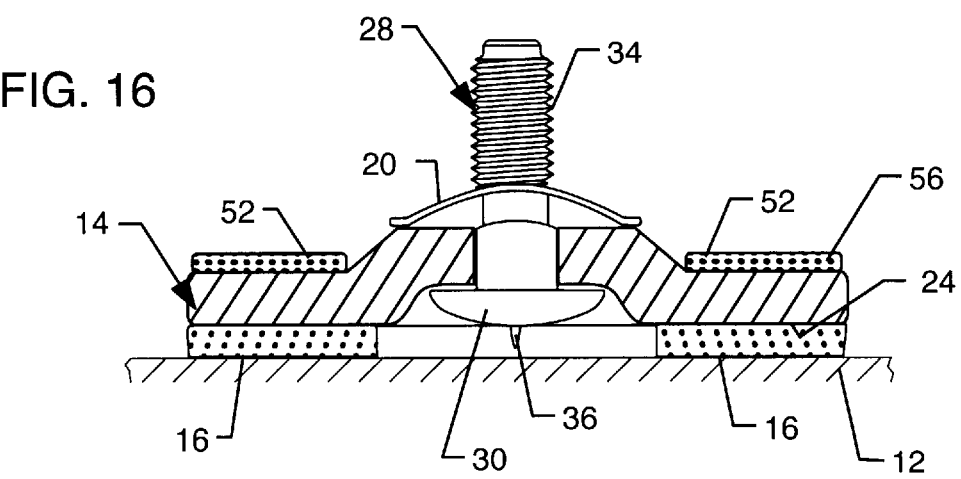
FIG. 16 is a fragmented sectional view showing initial placement of the embodiment of FIG. 15 onto a substrate.

FIGS. 15–16 illustrate still another alternative preferred form of the invention, wherein a pyrotechnic or pyrogenic heat source is not embedded within adhesive ring 16 but is instead mounted onto a front side of the base fixture for applying heat energy conducted through the base fixture to the bonding agent. Again, for ease of description, components common to those shown and described previously herein with respect to prior embodiments are identified by identical reference numerals. In this embodiment, the pyrogenic heat source is provided in the form of a heater ring 52 carried on the base fixture 14 at a front side thereof and functions to apply heat energy through the base fixture 14 to the bonding agent 16. In this version, the base fixture 14 is formed from a heat conductive material, such as a selected metal.

This modified attachment assembly (FIGS. 15–16) is designed for initial pressed mounting onto the substrate 12 in the same manner as previously described, and includes a temporary attachment means such as the illustrative concrete nail 36 or the like for temporary connection of the bolt head 30 to the substrate. This partially collapses the spring 20 for urging the base fixture 14 positively against the substrate 12, all as previously described, for the duration of the bonding agent cure time. Importantly, during this cure time, the heat source 54 is appropriately ignited by means of a match 58 or the like touched to a heater ring tab 56 for burning oxidizer and polymer within the heater ring 54 thereby creating the desired exothermic reaction for delivering heat energy through the base fixture 14 to the bonding agent 16 for activating and/or rapidly curing the bonding agent.

A variety of further modifications and improvements in and to the improved adhesive attachment assembly of the present invention will be apparent to those persons skilled in the art. For example, while the invention has been shown and described with respect to several specific types of attachment structures, person skilled in the art will recognize and appreciate that a wide variety of alternative attachment structures and devices may be employed.

What is claimed is:

1. An adhesive attachment assembly, comprising:
    a first attachment component defining a base surface;
    a heat activated member including a curable bonding agent mounted on said base surface, said bonding agent being for bonded attachment of said first attachment component to a substrate;
    a second attachment component carried by said first attachment component for movement between first and second positions respectively retracted from and advanced toward the substrate, when said first attachment component is seated against the substrate;
    an attachment member for at least temporarily securing said second attachment component to the substrate, when said heat activated member mounted on said base surface of said first attachment component is seated against the substrate with said second attachment component in said second position;
    a spring member reacting between said first and second attachment components for urging said base surface of said first attachment component with a positive force against the substrate when said second attachment component is in said second position; and
    a heat source for delivering heat energy to said heat activated member for rapidly curing said bonding agent.

2. The adhesive attachment assembly of claim 1 wherein said heat source comprises an electrical resistance heating element.

3. The adhesive attachment assembly of claim 2 wherein said heat source is embedded within said heat activated member.

4. The adhesive attachment assembly of claim 2 wherein said heat source is mounted on said first attachment component.

5. The adhesive attachment assembly of claim 4 wherein said first attachment component is formed from a heat conductive material, and further wherein said heat source is mounted on said first attachment component on a side thereof opposite said base surface.

6. The adhesive attachment assembly of claim 2 further including controller means for pulsating supply of electrical energy to said heat source.

7. The adhesive attachment assembly of claim 1 wherein said heat source comprises a pyrogenic heat source.

8. The adhesive attachment assembly 7 wherein said heat source comprises an oxidizer and polymer.

9. The adhesive attachment assembly of claim 8 wherein said heat source is embedded within said heat activated member.

10. The adhesive attachment assembly of claim 8 wherein said first attachment component is formed from a heat conductive material, and further wherein said heat source is mounted on said first attachment component on a side thereof opposite said base surface.

11. The adhesive attachment assembly of claim 1 wherein said attachment member comprises a pointed tip nail.

12. The adhesive attachment assembly of claim 11 wherein said nail comprises a concrete nail.

13. The adhesive attachment assembly of claim 1 wherein said attachment member comprises an adhesive material.

14. The adhesive attachment assembly of claim 1 wherein said first attachment component comprises a base fixture defining said base surface of generally annular shape circumscribing a central cavity, and further wherein said second attachment component includes an enlarged head positioned within said central cavity for movement between said first and second positions.

15. The adhesive attachment assembly of claim 14 wherein said attachment member is carried by said enlarged head of said second attachment component.

16. The adhesive attachment assembly of claim 14 wherein said second attachment component comprises a fastener including an elongated shank extending from said enlarged head through a central port formed in said base fixture.

17. The adhesive attachment assembly of claim 16 wherein said central port has a noncircular shape, and further wherein said shank includes a shoulder of mating noncircular shape extending through said central port to prevent relative rotation of said second attachment component with respect to said base fixture.

18. An adhesive attachment assembly, comprising:
    a first attachment component defining a base surface for receiving a curable bonding agent for bonded attachment of said first attachment component to a substrate;
    a second attachment component carried by said first attachment component for movement between first and second positions respectively retracted from and advanced toward the substrate, when said first attachment component is seated against the substrate;
    an attachment member for at least temporarily securing said second attachment component to the substrate, when said base surface of said first attachment component is seated against the substrate with said second attachment component in said second position;
    a spring member reacting between said first and second attachment components for urging said base surface of said first attachment component with a positive force against the substrate when said second attachment component is in said second position; and
    a pyrogenic heat source for delivering heat energy to said curable bonding agent for rapidly curing said bonding agent.

19. The adhesive attachment assembly 18 wherein said pyrogenic heat source comprises an oxidizer and polymer.

20. The adhesive attachment assembly of claim 19 further including a heat activated member mounted on said base surface and including said bonding agent, wherein said pyrogenic heat source is embedded within said heat activated member.

21. The adhesive attachment assembly of claim 20 further including an ignitable fuse cord coupled to said pyrogenic heat source.

22. The adhesive attachment assembly of claim 21 wherein said heat activated member includes a laterally outwardly extending tab including said fuse cord.

23. The adhesive attachment assembly of claim 19 wherein said first attachment component is formed from a heat conductive material, and further wherein said pyrogenic heat source is mounted on said first attachment component on a side thereof opposite said base surface.

24. The adhesive attachment assembly of claim 23 wherein said pyrogenic heat source is embedded within a heater ring mounted on said first attachment component, said heater ring including a laterally outwardly extending tab including an ignitable fuse cord coupled to said pyrogenic heat source.

25. The adhesive attachment assembly of claim 18 wherein said attachment member comprises a pointed tip nail.

26. The adhesive attachment assembly of claim 18 wherein said attachment member comprises an adhesive material.

27. An adhesive attachment assembly, comprising:
- a first attachment component defining a base surface for receiving a curable bonding agent for bonded attachment of said first attachment component to a substrate;
- a second attachment component carried by said first attachment component for movement between first and second positions respectively retracted from and advanced toward the substrate, when said first attachment component is seated against the substrate;
- an attachment member for at least temporarily securing said second attachment component to the substrate, when said base surface of said first attachment component is seated against the substrate with said second attachment component in said second position, said attachment member comprising a pointed tip nail;
- a spring member reacting between said first and second attachment components for urging said base surface of said first attachment component with a positive force against the substrate when said second attachment component is in said second position; and
- a heat source for delivering heat energy to said curable bonding agent for rapidly curing said bonding agent.

28. The adhesive attachment assembly of claim 27 wherein said heat source comprises an electrical resistance heating element.

29. The adhesive attachment assembly of claim 27 wherein said first attachment component is formed from a heat conductive material, and further wherein said heat source is mounted on said first attachment component on a side thereof opposite said base surface.

30. The adhesive attachment assembly of claim 27 wherein said heat source comprises a pyrogenic heat source.

31. The adhesive attachment assembly of claim 27 wherein said nail comprises a concrete nail.

32. The adhesive attachment assembly of claim 27 wherein said first attachment component comprises a base fixture defining said base surface of generally annular shape circumscribing a central cavity, and further wherein said second attachment component includes an enlarged head positioned within said central cavity for movement between said first and second positions.

\* \* \* \* \*